United States Patent [19] [11] 3,870,408
Kirr [45] Mar. 11, 1975

[54] VARIABLE CAPACITY FLEXIBLE SLIDE MAGAZINE

[75] Inventor: Frederick M. Kirr, Sunland, Calif.

[73] Assignee: Spindler & Sauppe, Inc., North Hollywood, Calif.

[22] Filed: Mar. 20, 1972

[21] Appl. No.: 236,302

[52] U.S. Cl................................ 353/120, 353/117
[51] Int. Cl...................... G03b 21/00, G03b 23/06
[58] Field of Search ........... 353/103, 116, 117, 120, 353/122; 206/73, 62 P

[56] References Cited
UNITED STATES PATENTS

| 3,161,109 | 12/1964 | Carrillo | 353/116 |
| 3,413,062 | 11/1968 | Zillmer | 353/117 |
| 3,532,421 | 10/1970 | Schlessel | 353/122 |
| 3,718,392 | 2/1973 | Harvey | 353/93 |
| 3,729,254 | 4/1973 | Frey | 353/109 |

Primary Examiner—Richard E. Aegerter
Assistant Examiner—A. J. Mirabito
Attorney, Agent, or Firm—Sellers and Brace

[57] ABSTRACT

A variable capacity reversible slide magazine for use on slide projector equipment comprising a multiplicity of flexibly connected similar plaques cooperating to provide a multiplicity of storage compartments each holding a single slide locked in storage until deliberately released. The assembly has limited flexing freedom in a single plane and the remote ends of one or more assemblies can be locked together to form either a continuous length or an endless loop of any desired capacity. The magazine is readily attached to and detached from an indexable drum having means interfitting with the magazine to hold its plaques uniformly and properly positioned as the magazine is indexed past the slide transfer and gating mechanism.

47 Claims, 11 Drawing Figures

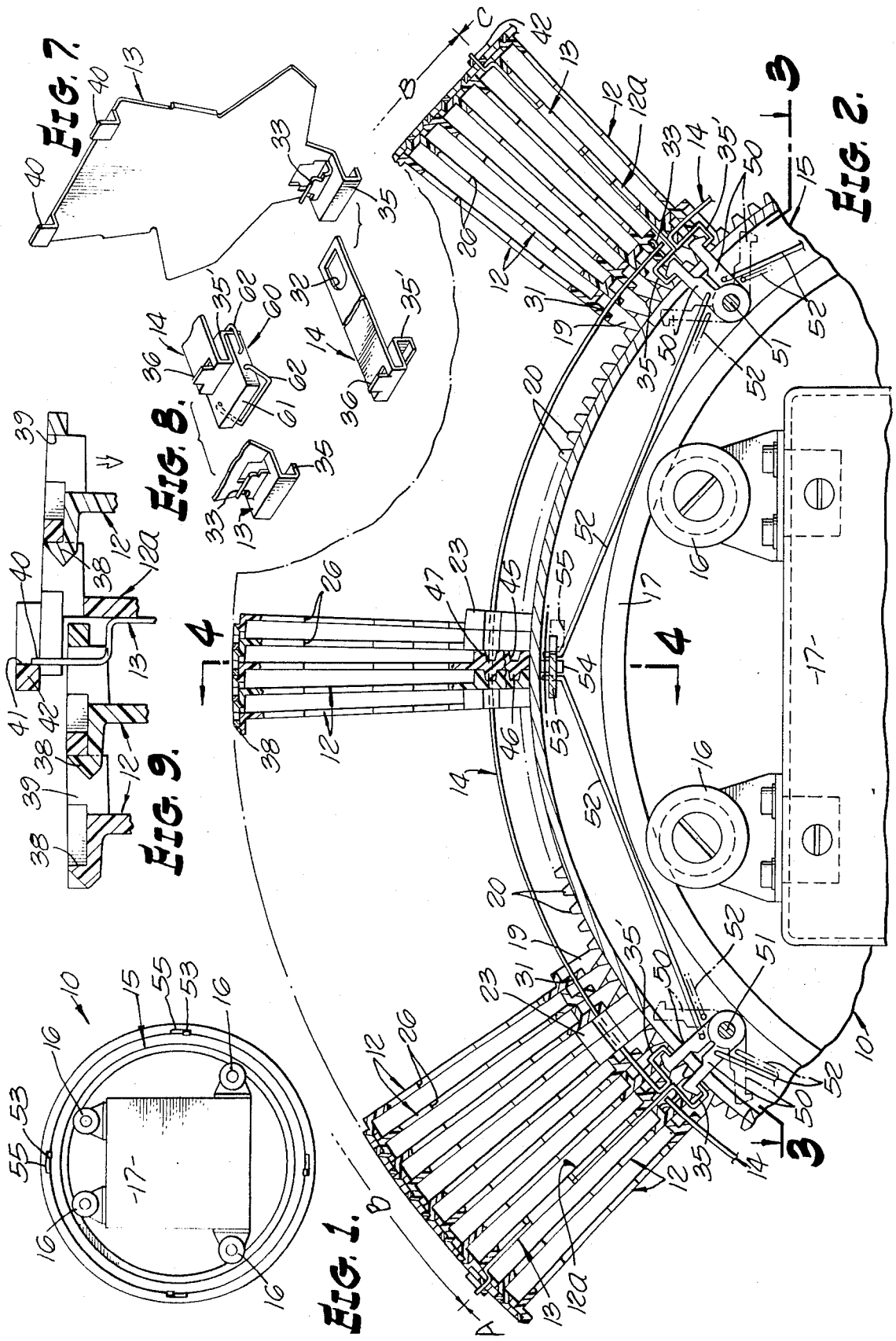

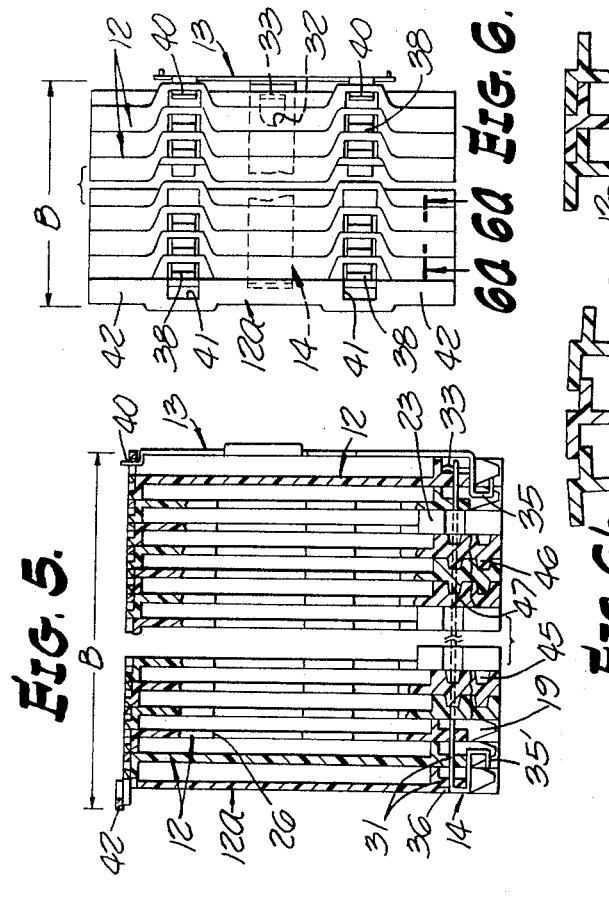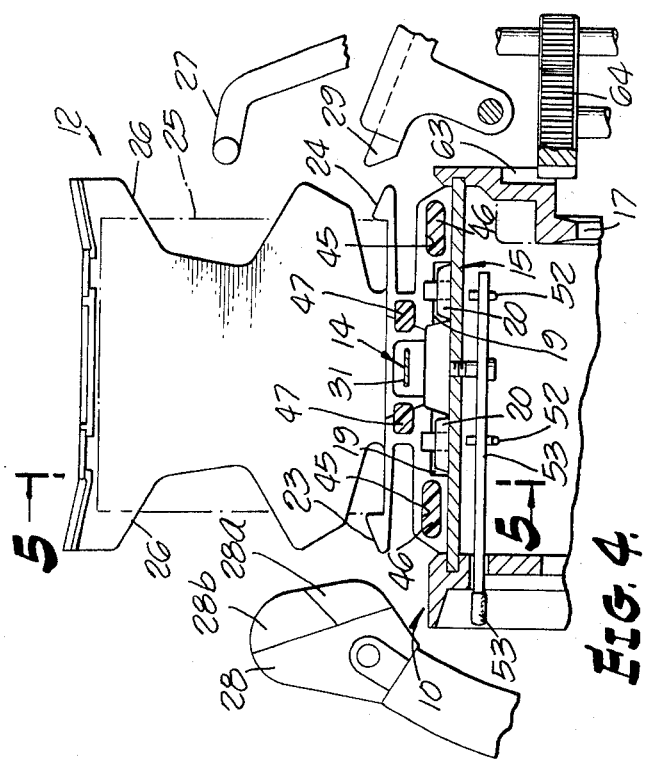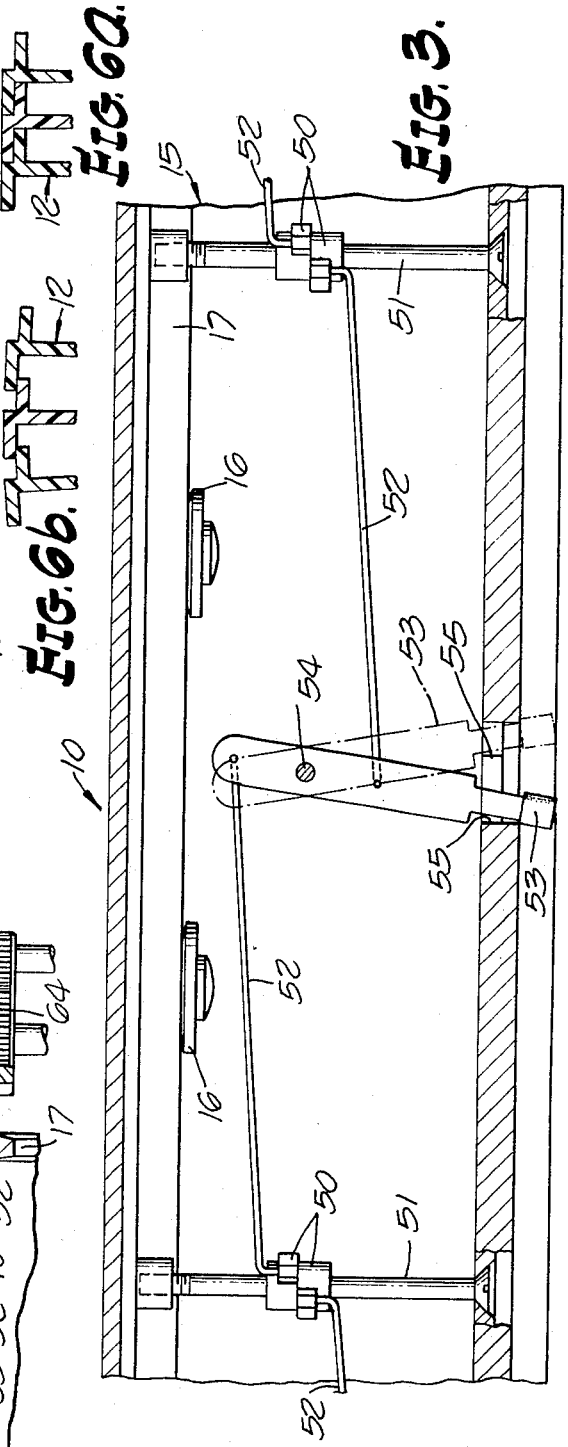

VARIABLE CAPACITY FLEXIBLE SLIDE MAGAZINE

This invention relates to slide projectors, and more particularly to an improved variable capacity slide magazine comprising a multiplicity of separator plaques held movably assembled to one another by a common tie member and adjacent ones of which cooperate to hold an individual image slide captive until ready for transfer into the projector.

Many proposals have been made heretofore for slide magazines adapted to be indexed into slide transfer position but these are subject to various disadvantages and shortcomings avoided by the present invention. Such prior constructions are of various types including tray, drum and belt. The tray type has the advantage of compactness and makes efficient use of storage space when not in use but has a fixed capacity for a given tray. The drum type likewise has a fixed capacity and makes very inefficient use of storage space. Certain of the belt type magazines heretofore proposed can be extended but are bulky, highly inefficient, structurally complex, easily damaged, subject to malfunctioning and various other deficiencies and are incapable of use with either front or rear projection screens without reloading the slides to achieve properly oriented projection.

By the present invention, there is provided a greatly improved, light-weight, highly compact, flexible magazine the capacity of which can be readily expanded to any desired extent and which can be used interchangeably with front or rear projection screens without need for reloading. The magazine is preferably manufactured in sub-assemblies in any convenient capacity, such as 50 or 100 slides, and which sub-assemblies are readily and quickly interlocked in series with any desired number of additional sub-assemblies and either in an open or a closed loop, and reversed if desired when transfering between rear and front projection screens. Each sub-assembly includes a multiplicity of similar plaques the opposite lateral halves of which are symmetrical, and adjacent ones of which cooperate to store a single slide, and all of which are flexibly interconnected along one peripheral edge by a flexible tie band. The edges opposite the tie strip have limited pivotal movement toward and away from one another as necessary to permit the interconnection of these sub-assemblies in a loop and to conform to the periphery of an indexing drum of projector equipment. When not in use, the components of the magazine sub-assemblies lie parallel to one another in a straight line for compact, efficient storage.

The slides can enter or exit from either lateral side of the magazine and are normally held captive between the separator plaques by flexible latch members formed integrally with the plaques. One peripheral edge of the plaques is shaped complementally to locator teeth of the magazine indexing means whether this be of the rack or drum type. In an illustrative embodiment, the plaques are molded from light-weight, tough, plastic material and include cooperating internesting recesses and bosses for holding the individual plaques in face to face alignment and free for limited relative pivotal movement toward and away from one another but restrained against relative movement in any other direction. The opposite lateral edges of the plaques are recessed sufficiently to expose rim areas of the slides to accommodate the user's fingers or, more particularly, slide transfer mechanism of the projector equipment.

It is therefore a primary object of the present invention to provide an improved, highly flexible, variable capacity, reversible magazine for use on slide projectors.

Another object of the invention is the provision of a simplified, rugged, highly efficient compact slide magazine storable in rectilinear form and having limited flexibility in a single plane.

Another object of the invention is the provision of a variable capacity slide magazine comprising a multiplicity of similar plaques held compactly assembled against one another by a common tie member and adjacent ones of which cooperate to store a single slide.

Another object of the invention is the provision of a multiplicity of similar light-weight plaques interfitting with one another for limited relative pivotal movement in a single plane and including means holding the same flexibly assembled to one another.

Another object of the invention is the provision of similar flexible slide magazines having provisions at their opposite ends for interlocking assembly to one another to provide either an open or a closed loop of any desired capacity.

Another object of the invention is the provision of a unitary slide magazine assembly comprising a plurality of separate plaques cooperating to form storage cells for individual slides and one peripheral edge of which plaques is shaped complementally to locator lugs of projector indexing means.

Another object of the invention is the provision of a reversible slide magazine usable to project properly oriented slides on either a front or a rear projection screen without need for reloading the slides.

Another object of the invention is the provision of a slide magazine arranged to receive and to dispense slides from and to slide projection equipment from either lateral side thereof and including separate slide latching means along either side of the magazine.

Another object of the invention is the provision of a slide magazine formed of a multiplicity of plaques held assembled in side by side relation and including means for storing and releasably retaining a single slide captive between adjacent plaques.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary, elevational view of a drum type indexing mechanism suitable for supporting either a single or a plurality of interconnected magazine sub-assemblies incorporating the principles of this invention;

FIG. 2 is a fragmentary sectional view on an enlarged scale through the upper portion of FIG. 1 showing portions of three magazine sub-assemblies connected together and mounted on the FIG. 1 indexing mechanism;

FIG. 3 is a fragmentary cross-sectional view taken along the curved line 3—3 on FIG. 2 showing details of the latching mechanism for holding the magazine in place on the indexing drum;

FIG. 4 is a fragmentary cross-sectional view taken along line 4—4 on FIG. 2 and additionally indicating portions of slide transfer components useful in transfering the slides between the magazine and a projector;

FIG. 5 is a fragmentary view, partly in section, taken along line 5—5 on FIG. 4, illustrating details of the opposite ends only of the magazine sub-assembly showing the unit in a horizontal plane with the flexible tension band holding the partition plaques interlocked;

FIG. 6 is a top plan view of FIG. 5;

FIGS. 6a and 6b are fragmentary cross-sectional views taken along line 6a—6a on FIG. 6, and showing the magazine plaques closed against one another in FIG. 6a and fanned apart in FIG. 6b;

FIG. 7 is an exploded perspective view of the flexible tie band for the plaques and details of its relationship to a specially formed locking plaque at one end of each magazine assembly;

FIG. 8 is a fragmentary exploded view of the adjacent ends of the tie bands of two magazine assemblies separated from one another together with the coupling accessory employed to lock two magazine assemblies together; and FIG. 9 is a fragmentary cross sectional view on an enlarged scale between the interlocked ends of two magazine sub-assemblies as they appear at the right hand end of FIG. 2.

Referring more particularly initially to FIGS. 1 and 2, there is shown a suitable projector index mechanism of the drum type for use with the invention variable slide magazine of which portions of three interlocked units A, B and C are shown in FIG. 2. Thus, it will be understood that two plaques only of magazine unit A are shown at the left hand end of FIG. 2, whereas magazine assembly B extends substantially from side to side of FIG. 2 with its right hand end interlocked with the two adjacent end plaques of magazine unit C.

Each of the magazines A, B and C comprises a multiplicity of identical plaques 12, a metal end plate or locking plaque 13 (FIG. 7) at the right hand end of each sub-assembly, and a flexible tie band 14 (FIGS. 2, 7) extending through the individual plaques near one peripheral edge and locking plaques 12 and 13 to one another. Indexing mechanism 10, as here shown, comprises a drum 15 supported in a vertical plane on rollers 16 carried by suitable support means 17. As is best shown in FIGS. 2 and 4, the lower rim edge 19 of plaques 12 are shaped to internest with two rows of locator teeth 20 distributed along the outer periphery of drum 15. These teeth hold the individual plaques properly separated and accurately related to the projector gate and the slide transfer mechanism of any type well known to those skilled in this art but not forming a part of the present invention.

The structural details of the individual magazine assembly A, B and C will now be described by the aid of FIGS. 2 and 4–8. Each of partition plaques 12 is preferably molded from a tough, resilient thermoplastic having a wall thickness of about 40 mils and a shape such as that shown in FIG. 4. The lower rim edge of the plaques is shaped to provide two rows of wedge shaped teeth 19,19 (FIG. 4) located to either side of tie strip 14 and which teeth mate with complementally shaped rows of teeth 20,20 on the juxtaposed periphery of drum 15 (FIG. 2). The area immediately above either end of the lower edge is deeply notched to provide operating room for a pair of aligned oppositely directed slide retainer latches or tangs 23,24 (FIG. 4). The distance between the teeth of these resilient latches is slightly greater than the standard dimension of a conventional projector slide indicated in dot and dash lines 25 in FIG. 4. Hence, when the slide is properly positioned in the magazine the two latches 23,24 cooperate in holding it captive until one or the other latch is depressed below the lower edge of the slide.

The opposite lateral edges of each plaque are also deeply notched as indicated at 26,26 in FIG. 4 so that an area of the opposite edges of slide 25 are exposed. This permits the operator to grasp the slide between the thumb and finger should he wish to remove it after first depressing one of the retainer tangs 23,24. Likewise, the depth of recesses 26 permits an operating lever 27 of slide transfer mechanism to swing back and forth in the plane of the plaques when returning the latter to its storage position. Also indicated along the left hand side of FIG. 4 is a cooperating slide pusher 28.

The right hand portion of pusher 28 has a lower portion 28a the converging faces of which are shaped to enter between a pair of adjacent plaques and spread these apart as the pusher engages the edge of a slide and transfers it out of the magazine and into its projecting position. The upper portion 28b of the pusher is somewhat thicker with its faces tapering radially of drum 15 and is effective to shift the plaques slightly longitudinally of slide magazine 12 to align a particular pair of plaques with the gate (not shown) of the projector. Upper portion 28b also substantially fills the storage space for a slide and safeguards against entry of the pusher between a plaque and one face of a slide and resulting in failure of the pusher to transfer a slide into projecting position. A latch releasing lever 29 is pivotally supported on the other side of the magazine and pivots counterclockwise against latch 24 to depress it when the slide is to be released from the magazine into projecting position.

From the foregoing and the showing in the drawings, particularly FIG. 4, it will be recognized that the magazine is symmetrically designed throughout and so that slides can be inserted into or transfered out of either lateral end of the individual slide storage cells. Likewise, the slide handling and operating members 27,28,29 are equally effective irrespective of which end of the magazine is foremost when positioned on the drum. Additionally, it will be understood that drum teeth 20 are so positioned that a radial bisector through the slide storage cells coincides with the same radial plane through the drum teeth irrespective of the two assembly positions of the magazine on the drum. These unique features are of considerable importance because a loaded drum may be employed with either end foremost on either a front or a rear screen projector without reloading the slides to obtain properly oriented projected images.

The flexible metal tie strip 14 holding a series of plaques 12 in face to face alignment has a loose fit in rectangular opening 31 through each plaque near its lower edge. The right hand end of strip 14 (FIGS. 5, 6, 7) has an opening 32 which interlocks with a tang 33 integral with the sheet metal locking plaque 13. The other or left hand end of strip 14 has a downturned tang 35' similar to but projecting opposite from tang 35 of locking plaque 13. It also has an upwardly projecting lug 36 which seats against the exterior face of the last plaque at the left hand end of the magazine. It will be understood that the flexible tie string 14 holds a specified number of plaques 12 assembled with sufficient looseness between the plaques to permit lifted pivotal movement to the arched position of the magazine shown in FIG. 2.

It is important that adequate means be incorporated in the plaque design to prevent excessive pivotal movement between any adjacent pair of plaques since this would permit the slides to escape from between the upper edges of the assembly. An appropriate safeguard against this happenstance will be best understood from FIGS. 2 and 9, the latter of which shows a cross-sectional view on an enlarged scale through the upper edge of several assembled plaques. It will be noted that the upper edge of each plaque is T-shaped in cross-section with portions of the T-head projecting to the right and to the left from the respective faces of the plaque. The left hand edge of the T-head is formed with an upwardly projecting latch tang 38 whereas the other end of the T-head is formed with a vertical opening 39 into which the latching tang 38 of an adjacent one of the plaques projects. As shown in FIG. 9, the two right hand plaques 12,12' are spread to the maximum distance permitted by tang 38 of the right hand one of the plaques. Movement of the plaques toward one another is limited by the contact of the left hand nose of tang 38 with the adjacent face of the plaque to the left thereof.

FIG. 9 also shows the manner in which the locking lugs 40,40 at the upper end of locking plaque 13 (FIG. 7) operate to lock the adjacent upper ends of two magazine units together, such as magazines B and C. As shown in FIG. 8 the two sub-assemblies are in the process of assembly with lugs 40 just entering openings 41 formed in a specially constructed keeper strip 42 molded integral with the upper edge of the T-head of the single plaque 12a at the left hand end of one of the magazines (FIG. 5). Thus, the operator maneuvers the ends of two magazine sections to engage lugs 40 into openings 41 of the other assembly and then shifts the two magazines crosswise of their ends, the fully assembled position being that shown between magazines B and C in FIG. 2.

Internesting bosses and recesses cooperate with one another and with other interfitting components of the plaques to safeguard against relative rotational movement of the opposite ends of the magazine about its own longitudinal axis. These internesting bosses are located to either side of flexible strip 14, such as in the manner best shown in FIGS. 4 and 5. For example, the right hand face of plaques 12 are provided with oblong recesses 45 into which similarly shaped tapered bosses 46 project from the left hand face of the plaques. A second pair of internesting bosses and recesses 47,47 (FIG. 2) are located in the general plane of strip 14 and disposed laterally to either side thereof. It will be understood that the specially constructed end plaque 12a at one end of the magazine omits bosses 46 and 47 in order to permit the adjacent ends of two magazine units to be slid crosswise of one another when interlocking them together. This is true whether the units are being assembled or disassembled and whether this operation takes place on or off the indexing drum 15.

It will be clear from the foregoing that a single magazine having a capacity of any desired amount as 50 to 100 slides comprises a unit such as that illustrated in FIGS. 5 and 6, it being understood that most of the plaques have been omitted from these Figures to save space. The selected number of plaques are held together by a single tie strip 14 having one end interlocked with the end plaque 12 of the magazine unit and the punch-out 32 at its right hand end interlocked with tang 33 of the retainer or locking plaque 13. The latter, preferably formed of sheet metal, cooperates with the adjacent one of the plaques 12 to form a storage chamber for a slide at the right hand end of the magazine. Such an assembly may be used alone or in combination with one or more other similar magazine units simply by interlocking their adjacent ends together in the manner described above and illustrated by FIGS. 2 and 9. When locked together, the locking plaque is shaped to lie flush against the surface of the end plaque of a second magazine unit in the manner clearly illustrated in FIG. 2.

Either a single or a plurality of the magazines are held detachably to indexing mechanism 10 in the manner best shown in FIG. 2. Distributed at intervals about the periphery of drum 15 are associated pairs of separate latches 50,50 facing in opposite directions and supported on a pivot pin 51. These oppositely facing latches are beveled so as to be cammed in a direction to receive the hook shaped retainer tangs 35,35' projecting downwardly from the lower end corners of one of the magazine units. As best appears in FIGS. 2 and 7, retainer tang 35 is carried by the lower edge of the special plaque 13, whereas retainer tang 35' is formed at one end of the flexible tie band 14. Latches 50,50 are preferably spring biased away from one another in any suitable manner, as by a suitable spring not shown.

To load drum 15 with a single magazine, the magazine is lowered against the upper side of the drum with tangs 35,35' aligned with a respective one of latches 50,50. As the magazine is pressed downwardly, the edges of tangs 35,35' engage and cam the latches 50 to their open position and so as to engage over and interlock with tangs 35,35' when the magazine is in its proper assembled position on the drum. Latches 50,50 are interconnected by links 52,52 and a common operating lever 53 pivoted to the drum at 54, the manner in which this lever operates an associated pair of latches 50,50 being readily understood by consideration of FIG. 3. Lever 53 projects outwardly through the face of the drum and operates in a slot having a notch 55 (FIG. 3) positioned to lock the latches in open position if this is desired for any reason, as when using a continuous belt magazine. It will also be understood that the full circumference of the drum may be similarly loaded with magazine sub-assemblies if so desired.

If it is desired to use more magazines than required to fill drum 15, this is readily accomplished using the coupling device designated generally 60 in FIG. 8. A typical device suitable for this purpose comprises a rectangular block 61 having its opposite ends proportioned to fit within the U-shaped tangs 35,35'. Each end half of block 61 is provided with a spring keeper 62 designed to latch over the outer end portion of the respective tangs 35,35'. Thus in FIG. 8, one of the keepers 62 is shown in assembled position about the exterior of tang 35' whereas the other keeper 62 is pivoted to its unlatched position in readiness to receive tang 35 of an adjacent magazine assembly. After the latter has been assembled over the exposed end of block 61 keeper 62 is pivoted clockwise about the rear end of tang 35 in the same manner just mentioned in connection with tang 35'.

Any number of magazine sub-assemblies may be assembled and latched to one another in this manner using a similar coupler 60 to form a continuous loop. The very flexible loop so formed is then draped over the top of the feed drum 15 and remains in position thereon with the lower edges of the individual plaques properly seated between teeth 20 of the drum. Prior to draping the magazine loop over the drum the operating lever 53 for latches 50 is pivoted counterclockwise and depressed into locking notch 55 thereby holding all of the latches 50 fully retracted such that they do not interfere with the seating of the magazine loop on the feed drum. Accordingly, it will be understood that the magazine loop remains supported on the drum solely by gravity with only the plaques above a horizontal plane through the drum axis engaged with teeth 20 on the drum. Accordingly, the magazine loop can be freely lifted from or replaced on the drum without need for operating latches 50 which remain fully retracted.

Although the drive mechanism for the indexing mechanism 10 is no part of this invention, it will be seen from FIG. 4 that this drum has teeth 63 formed along one face which mate with a driving gear 64.

While the particular variable capacity flexible slide magazine herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A slide magazine comprising a multiplicity of thin-walled plaques arranged side by side and with adjacent pairs of plaques cooperating to hold a single image slide therebetween, and means for locking said multiplicity of plaques captively assembled to one another with limited freedom to pivot toward and away from one another, whereby said slide magazine is adapted for use selectively in a rectilinear rack feed and in a drum feed slide projector mechanism.

2. A slide magazine as defined in claim 1 characterized in that said locking means is located adjacent the peripheral edge of said plaques.

3. A slide magazine as defined in claim 2 characterized in that said locking means is flexible and common to all of said plaques.

4. A slide magazine as defined in claim 3 characterized in that said locking means common to said multiplicity of plaques is a thin non-elastic tension strip.

5. A slide magazine as defined in claim 1 characterized in the provision of first and second sets of similarly assembled multiplicities of plaques assembled to one another and including means for holding said first and second sets together in end to end relation.

6. A slide magazine as defined in claim 5 characterized in that said means for holding one pair of adjacent ends of said first and second sets together comprises releasable coupling means embracing the adjacent transverse edges of means fixed to said one pair of adjacent ends of said first and second sets of plaques.

7. A slide magazine as defined in claim 5 characterized in that said coupling means for holding one pair of adjacent ends of said first and second sets together comprises means readily attachable to and detachable from said sets of plaques and including resilient means bridging said adjacent ends and cooperating therewith to lock said adjacent ends together.

8. A slide magazine as defined in claim 5 characterized in that said means for holding said first and second sets together includes means mechanically interconnecting the respective locking means of said first and second sets of plaques.

9. A slide magazine as defined in claim 8 characterized in that said means for mechanically interconnecting said first and second sets of multiplicities of plaques together includes means interconnecting the radially opposite edges of the plaques at the adjacent ends of said first and second sets of plaques.

10. A slide magazine as defined in claim 9 characterized in that said mechanical interconnecting means includes thin metallic means lying close to the face of one end plaque and having means at the opposite ends thereof for interlocking engagement with portions of adjacent plaques of said first and second sets of plaques.

11. A slide magazine as defined in claim 10 characterized in that said metallic means includes means normally holding the same permanently assembled to one of said sets of plaques.

12. A slide magazine as defined in claim 8 characterized in that the opposite ends of a plurality of said sets of plaques are interconnected to provide an endless array of flexibly related plaques.

13. A slide magazine as defined in claim 1 characterized in that said flexible locking means is threaded through passage means extended transversely of said plaques in alignment with one another.

14. A slide magazine as defined in claim 13 characterized in that said plaques include internesting bosses and recesses on the opposed faces thereof cooperating to hold said plaques aligned.

15. A slide magazine as defined in claim 14 characterized in that said bosses and recesses are located laterally of said flexible locking means.

16. A slide magazine as defined in claim 15 characterized in that said bosses and recesses are located laterally to either side of said flexible locking means.

17. A slide magazine as defined in claim 1 characterized in that said plaques include interlocking tangs and recesses along an edge thereof remote from said flexible locking means and designed to limit pivoting movement of said plaques away from one another.

18. A slide magazine as defined in claim 17 characterized in that interlocking tangs and recesses are arranged in spaced apart rows extending generally normal to the face of said plaques.

19. A slide magazine as defined in claim 17 characterized in that said interlocking tangs and recesses are along the edges of said plaques directly opposite said flexible locking means.

20. A slide magazine as defined in claim 17 characterized in that said plaques include internesting flanges projecting from the opposite faces thereof along the peripheral edges remote from said flexible locking means.

21. A slide magazine as defined in claim 1 characterized in that the spaces between adjacent ones of said plaques are open to receive image slides along either opposed lateral edge thereof.

22. A slide magazine as defined in claim 1 characterized in the provision of slide retainer means operatively associated with each of said plaques and operable to hold a single slide releasably captive between adjacent ones of said plaques.

23. A slide magazine as defined in claim 22 characterized in that said slide retainer means is operable to release a slide from either lateral edge of said multiplicity of plaques.

24. A slide magazine as defined in claim 22 characterized in that said slide retainer means is resilient and carried by individual ones of said plaques.

25. A slide magazine as defined in claim 22 characterized in that said slide retainer means comprises a resilient latching tang integral with each plaque and adapted to flex into and out of locking engagement with respect to an adjacent corner of an image slide when the latter is fully inserted between adjacent ones of said plaques.

26. A slide magazine as defined in claim 22 characterized in that said slide retainer means includes means operable as pressure is applied thereto to release a selected image slide from between adjacent ones of said plaques.

27. A slide magazine as defined in claim 1 characterized in that said plaques are molded in one piece from plastic material.

28. A slide magazine as defined in claim 1 characterized in that one set of adjacent edges of said plaques includes means mateable with indexing mechanism for indexing said plaques into position relative to the gate of slide projecting equipment.

29. A slide magazine as defined in claim 28 characterized in that said means on one set of adjacent edges of said plaques and mateable with indexing mechanism is located substantially in a medial transverse plane bisecting the slide storage space between adjacent ones of said plaques.

30. A slide magazine as defined in claim 28 characterized in that said mateable means for indexing mechanism includes lugs projecting from an edge of said plaques adapted to engage indexing means of indexing mechanism.

31. A slide magazine as defined in claim 1 characterized in the provision of movable support means for said multiplicity of plaques including means for indexing said plaques into a selected position for transfer of an individual image slide out of a storage cell between adjacent ones of said plaques, and internesting lugs and recesses on said support means and said plaques cooperating to hold said plaques releasably in a predetermined assembled position on said movable support means.

32. A slide magazine as defined in claim 31 characterized in the provision of locking means carried by said movable support means and engageable with said assembled multiplicity of plaques for holding said plaques temporarily locked to said support means for indexing past a slide display station.

33. A slide magazine as defined in claim 31 characterized in that said movable support means for said plaques comprises a drum, and said plaques being in direct supporting contact with a portion only of the periphery of said drum.

34. A slide magazine as defined in claim 33 characterized in that said drum is supported on a generally horizontal axis, and said plaques resting by gravity against the upper half of said drum.

35. A slide magazine as defined in claim 21 characterized in that said opposed lateral edges of said plaques are recessed toward the centers of said plaques so that the lateral edge of image slides stored between adjacent plaques protrude outwardly beyond the edges of said recesses to accommodate slide handling means while in use to store a slide and to dispense a slide.

36. A slide magazine as defined in claim 21 characterized in that the opposed lateral edges of said plaques are chamfered to provide pilot means for guiding slides into storage position between plaques.

37. A slide magazine as defined in claim 24 characterized in that said plaques and said slide retainer means are formed in one unitary piece of resilient impact-resistant thermoplastic material.

38. A slide magazine as defined in claim 1 characterized in the provision of means interconnecting the opposite ends of said multiplicity of plaques to form an endless flexible loop of plaques each adjacent pair of which is sized to accommodate a single conventional image slide in readiness for dispensing into gating mechanism of slide projector equipment.

39. A slide magazine as defined in claim 38 characterized in that the opposite lateral edges of said endless loop of plaques are recessed to expose the edge portions of slides stored therein and effective to accommodate slide handling means while in use to store and dispense slides in the spaces between adjacent plaques.

40. That improvement in an image slide storage magazine which comprises a long flexible locking strip threaded through a multiplicity of slide separators near one transverse edge thereof to hold said separators flexibly assembled for limited pivotal movement toward and away from one another, and means at the opposite ends of said locking strip for releasably coupling the same to one end of the flexible locking strip of a similar slide storage magazine whereby the slide storing capacity of said slide storage magazine can be readily expanded and reduced to suit operating needs.

41. That improvement defined in claim 40 characterized in that said means for interlocking said strip with said slide separators includes a specially constructed partition at one end of said strip, said specially constructed partition having tang means on the opposite edges thereof, the tang means on one edge being interlockable with one end of said locking strip, and the other of said tang means being interlockable with the adjacent end partition at one end of a second similar slide storage magazine when said slide magazines are in end-to-end abutting alignment.

42. A slide magazine as defined in claim 28 characterized in that a transverse bisector plane between adjacent ones of said plaques bisects the associated ones of said lugs and recesses on said plaques and on said support means therefor thereby to accurately relate each slide storage space in said magazine to said support means in readiness for the transfer of a slide from said magazine into a projecting position of image projector equipment irrespective of which end of the assembly of plaques is foremost when mounted on a feed drum.

43. A slide storage magazine having a plurality of slide storage cells for individual slides arranged in a row, means along either lateral side of said magazine for retaining a slide in each storage cell and operable to release a slide in any cell from either lateral side of said storage magazine, and means on said magazine for supporting the magazine on projector magazine indexing means with either end of said magazine facing forwardly, whereby the slides are projectable at the user's option onto the front of a front projection screen or on the rear of a rear projection screen with the projected image properly oriented in each instance without need for reloading the magazine.

44. A slide magazine as defined in claim 43 characterized in that the opposite lateral halves of said magazine are symmetrical in construction and arranged to cooperate interchangeably with slide indexing transfer mechanism of projector equipment for which said magazine is designed.

45. A slide magazine as defined in claim 43 characterized in that slide storage cells are arranged side-by-side with the bottom of the cells adjacent the bottom edges of the slides stored therein, and said means for retaining said slides in said storage cells comprising slide retaining latch means for said slides operable from either lateral side of said storage cells depending on the end of said magazine facing forwardly in a particular projector.

46. A slide magazine as defined in claim 45 characterized in that said latch means is located along either lateral side of said magazine and selectively operable depending upon which lateral side the slides are to be released.

47. A slide magazine as defined in claim 43 characterized in that the opposite lateral sides of said storage magazine are deeply notched to expose the opposite lateral portions of slides when present in said storage cells.

* * * * *